R. D. BRADLEY.
Shovel and Tongs.
No. 56,169.
Patented July 10, 1866.
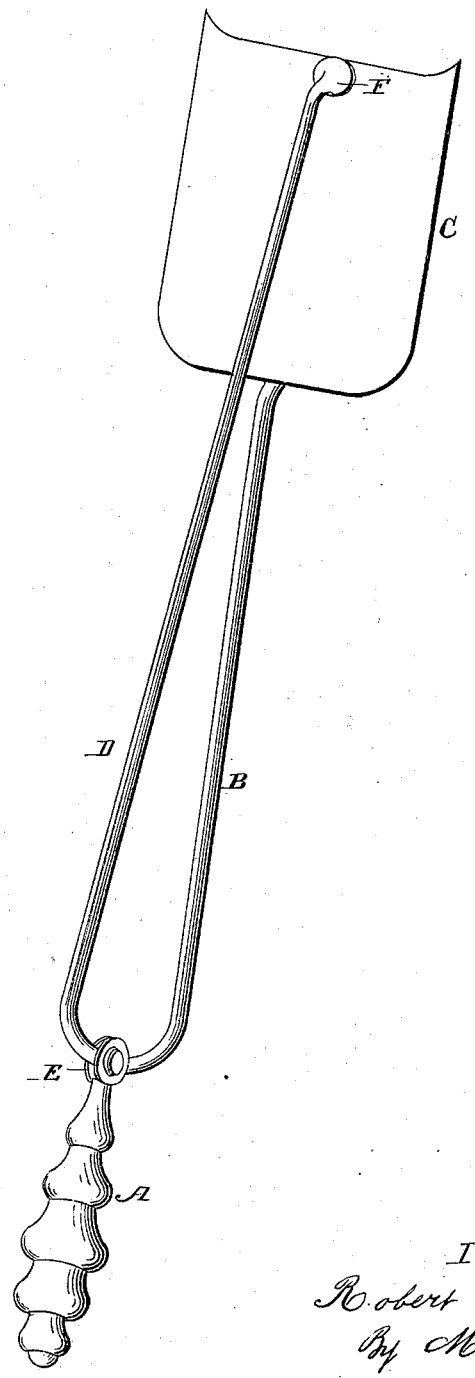
Witnesses:
Inventor:
Robert D. Bradley,
By Munn & Co.
Attorneys.

UNITED STATES PATENT OFFICE.

ROBT. D. BRADLY, OF PRESTON, MARYLAND.

IMPROVED SHOVEL AND TONGS.

Specification forming part of Letters Patent No. 56,169, dated July 10, 1866.

*To all whom it may concern:*

Be it known that I, ROBERT D. BRADLY, of Preston, in the county of Caroline and State of Maryland, have invented a new and useful Combination of Fire Shovel and Tongs; and I do hereby declare the following to be a full, clear, and exact description of the nature, construction, and operation of the same, sufficient to enable one skilled in the art to which it appertains to construct and use the same, reference being had to the accompanying drawing, which is made part of this specification, and in which my improvement is represented by a perspective view.

The improvement consists in the attachment of a shovel to one leg of a pair of tongs, so that an efficient grasping-tool is afforded at pleasure, in addition to the ordinary uses of the shovel proper.

I am aware that a double-jointed arm has been attached to the stock or handle of a shovel, but this gives an insecure grasp; whereas with my combined shovel and tongs a secure grasp is afforded to anything within its capacity, the joint being single and the grasping-arm having no tendency to slip back from its hold.

In the drawing, A is the handle, the leg B being firmly attached thereto, and having the shovel C at its end, while the leg D is jointed at E, and has a hilt on F at its end, in opposition to the shovel C, and capable of being raised from contact with the said shovel to any convenient extent.

By turning the tool over so as to have the tong below a cover may be readily lifted from or onto the stove, and when desired the shovel may be used for lifting ashes or other purposes, either with or without raising the tong from contact therewith.

For the ordinary use of lifting and carrying a coal of fire or a lighted brand, greater steadiness and security is obtained than with mere tongs, and the falling embers are retained by the shovel.

Where a double joint is used the tong is apt to become locked or cramped in an inconvenient position, but with my arrangement the tong and shovel are always in the required position for duty.

For the conversion of the ordinary tongs into a combination of shovel and tongs my mode is very convenient, as it only requires the shortening of one leg and shaping the end for attachment to a blade or shovel.

Having described my invention, what I claim as new, and desire to secure by Letters Patent, is—

The combination of shovel and tongs, constructed and operating as described.

The above specification of my improved combined shovel and tongs signed this 1st day of May, 1866.

ROBT. D. BRADLY.

Witnesses:
ALEX. A. C. KLAUCKE,
W. F. HALL.